Patented Oct. 27, 1925.

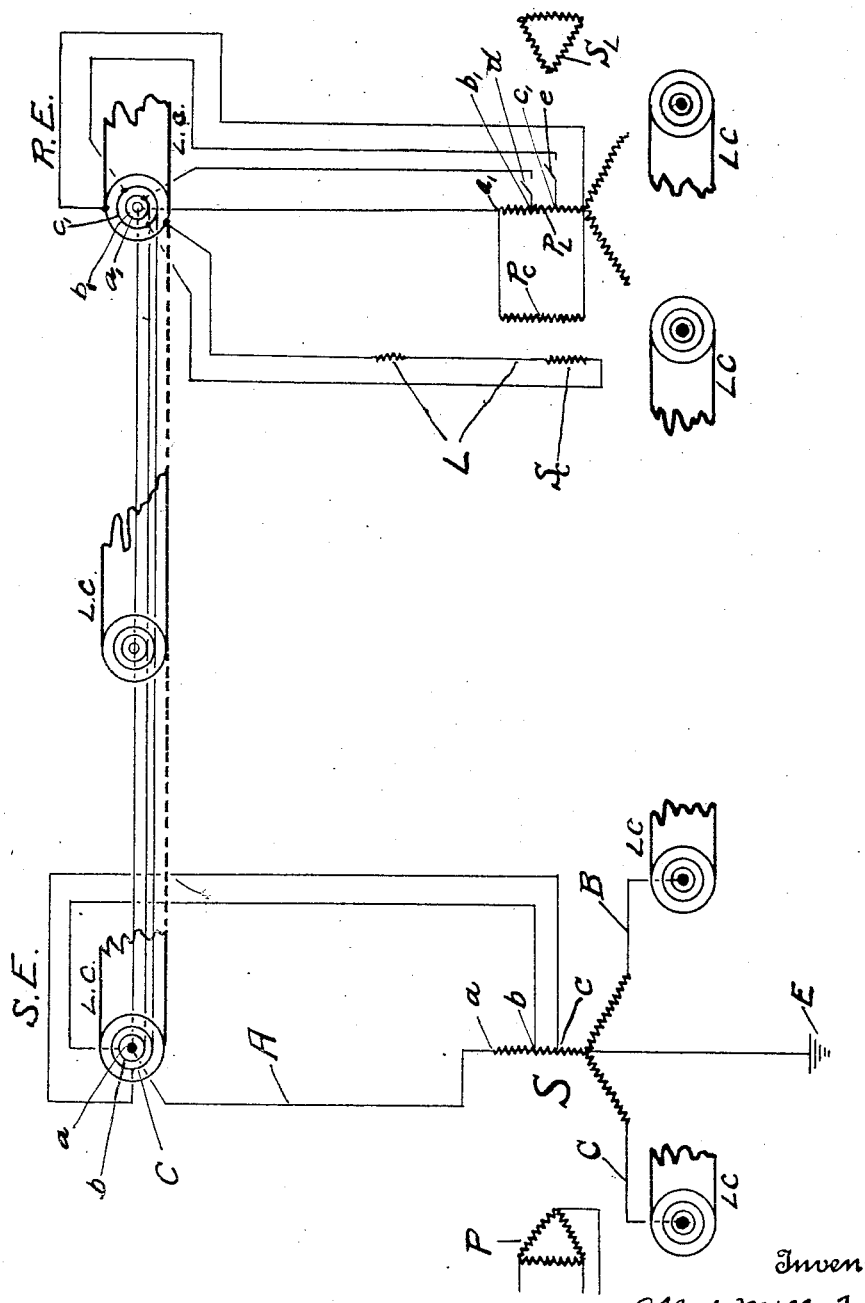

1,559,017

UNITED STATES PATENT OFFICE.

ALFRED MILLS TAYLOR, OF ERDINGTON, ENGLAND.

ELECTRICAL POWER-TRANSMISSION SYSTEM.

Application filed January 16, 1925. Serial No. 2,955.

*To all whom it may concern:*

Be it known that ALFRED MILLS TAYLOR, a subject of the King of England, residing at Erdington, Birmingham, England, has invented certain new and useful Improvements in Electrical Power-Transmission Systems (for which I have filed applications in Great Britain, applications Nos. 25,890, 10-17-23; 15,053, 6-23-24; 17,003, 7-16-24; 18,494, 8-2-24), of which the following is a specification.

This invention has reference to means for and methods of supplying the charging currents for electric cables and relates particularly to improvements in my prior system of electric transmission described in the specification of British Letters Patent No. 195429 and corresponding U. S. Patent No. 1,466,069 in which concentric intersheath cables were proposed wherein the kilovolt ampere energy required for the requisite excitation of the distant parts of the cable was transmitted to a substation or stations at the maximum pressure along the central core of the cable and in which the said energy was transformed at the said substation or stations to the voltage required to effect the requisite charging of the capacity current to the intersheaths of the cable the current being fed into the system in such a manner that it traversed the lines in both directions.

The present invention provides a simplification of the aforesaid system and dispenses with the substation or stations for feeding the capacity current into the line, the improved system employing the main stations both for transmitting the high capacity current to the centre core of the cable system and by means of proportional tapping from the phase windings of the transformers of this system introducing the requisite capacity current to the intersheaths.

In electric transmission systems of the aforesaid kind it is found that the capacity current taken by the outermost intersheath is considerably larger than the capacity current taken by the intermediate intersheath or intersheaths and in the case of a long line the difference of current is considerable and this current has to be taken by the outermost intersheath. This current is transmitted at a lower pressure (about one third of the total pressure of the transformer). It is necessary in order to avoid serious overheating and undue fluctuations of pressure that the outer intersheaths should contain more copper which by reason of the high current at the low transmission pressure would be very inefficiently used while the cost of such extra copper materially increases the cost of the system.

The present invention has for its objects the provision of means for effecting an efficient proportioning of the potential gradient applied to the intersheaths and the distribution of the capacity current between them whereby the quantity of copper in the outer intersheath may be reduced and as a corollary said outer intersheaths may be constructed of a metal of lesser conductivity than copper thereby admitting of the utilization of a ferrous aluminium or other metallic conductor with consequential beneficial results in the transmission system. The invention further resides in the provision of an improved means for effecting the balance between the capacity currents fed to the outer intersheath and the intermediate intersheath or intersheaths.

The invention consists of a means of supplying the charging currents of electric cable transmission systems of the kind hereinbefore referred to wherein the requisite capacity current for the outermost intersheath is transmitted through the central core of the cable at the maximum transmission voltage to the point or points at which the said current is to be fed to the outer intersheath, the requisite capacity currents for the intermediate intersheaths and the desired pressure therefor being obtained either by independent transformers having their primaries connected between line and neutral or by proportionally tapping the phase windings of the transformer which supplies the load at the feeding point or points; whereby an efficient proportioning of the potential gradient applied to the outermost intersheath and the intermediate intersheath or intersheaths is obtained and the quantity of the conducting material required for the intersheaths is minimized.

The invention further resides in the formation of the outer intersheaths of a metal of lesser conductivity than copper said substitution being a corollary of the minimization in the quantity of conducting material required. The invention also resides in the employment of an inductance external to the winding of the line transformer which supplies the charging current to the outermost intersheath said inductance being introduced in the lead connecting the said intersheath and the transformer winding by which means a more efficient maintenance of the potential gradient is attained and a reduction of the current that would be fed into the intersheath during a short circuit is ensured resulting in a further reduction in the quantity of the conducting material required.

In the drawing, the figure discloses portions of an electrical power transmission system to which the present invention has been applied, all parts being shown diagrammatically.

The invention will now be described with particular reference to the accompanying diagram wherein the letters S. E. represent the sending end of a three-phase electric transmission system in accordance with the invention and the letters R. E. the receiving end of such a system.

The low potential bus-bars (not shown) of the generating station are connected to the primary windings P of a transformer the said windings whereof are connected in "delta" in the ordinary way. The secondary windings S of the transformer are connected in "star" the neutral point being connected to earth E and the extreme end of each winding is connected to the central core of one or other of the three concentric cables LC which connect the sending and receiving ends of the system. This connection of a secondary winding of the transformer is shown in the diagram for one-phase A only but it will be understood that the connections are made from the other two phases B and C in a similar manner. In the diagram the extreme end $a$ of the secondary winding of the phase A is connected to the central core $a$ of the upper cable LC tappings $b$ $c$ intermediate the extreme end of the windings and the neutral point being connected with the cores $b$ $c$ of the said cable.

Referring now to the receiving end R. E. the primary windings of a transformer $P_L$ are connected in "star" and the extremities of each winding are connected to the central cores of the other ends of the three concentric cables LC as indicated by the tapping $a_1$. This winding of the transformer $P_L$ has connected thereto the primary winding $P_c$ of a line charging transformer the secondary winding $S_c$ whereof is connected to the outer lead sheath of the upper cable LC and to the outer intersheath thereof whereby the requisite capacity current is transmitted to the outer slice of dielectric of the said cable. Intermediate the secondary winding $S_c$ and the lead to the cable is connected an inductance L. The requisite currents for the outer intersheaths of the cable may be taken from tappings $b_1$ and $c_1$ on the primary windings $P_L$ of the transformer said tappings being controlled by means of switches $d$ $e$. These switches $d$ $e$ admit of the transmission being carried on in the event of a breakdown in the transformer $P_c/S_c$, since upon a fault in the said transformer being detected it is only necessary to close the switches $d$ $e$ to ensure the continuance of the necessary charging currents to the intersheaths.

It will be understood that similar tappings $a_1$ $b_1$ $c_1$ are taken from the other phases of the transformer to the other cables LC and that each phase is connected with the primary windings of a line charging transformer the secondary winding whereof incorporates an inductance as hereinbefore described.

The transformer $P_c/S_c$ is a line transformer and only deals with the feeding of the charging current into the line, the transformer $P_L/S_L$ supplying the load at the receiving station.

The above arrangement ensures that a leading current is drawn into the primary winding $P_c$ and is fed from the secondary winding $S_c$ to the outer intersheath whereby the whole of the K. V. A. charging energy is transmitted through the central core of the cable at the highest voltage of transmission and consequently at a low amperage and is fed to the outer intersheath through the secondary winding $S_c$ at a lower voltage but at an increased amperage. Moreover the charging currents may be taken from the requisite tappings on the transformer without interfering with the current passing through the primary winding $P_L$ and hence the potential gradient between the respective intersheaths can be efficiently and definitely proportioned.

By reason of this definition of the proportion of capacity current to be taken by each intersheath it is possible to determine the quantity of the conducting material required and which owing to the removal of the risk of fluctuating voltages is much less than has heretofore been necessary. Accordingly the outer cores may be formed of a material of lesser conductivity than copper and preferably an iron wire is used which also possesses the useful property of being more rigid than copper which additional rigidity serves to prevent or to minimize the buckling of the layers of dielectric contiguous thereto. The employment of iron wire thus permitted also allows of the beneficial utilization of the fact that iron possesses a large impedance. Hence on the occasion of a fault between any two intersheaths the impedance of the iron would restrict to reasonable dimensions the charging current which would be fed through the intersheath from the generating station until the transformer $P_c$ could re-adjust itself to the altered conditions.

The passage of a "leading" current for the cable charging through the inductance L adds to the voltage given by the secondary of the transformer, and thus differentiates between charging current and load current, but on the other hand if a short circuit takes place through the insulation failing between any two of the intersheaths at any point, the current fed into this short circuit by the secondary $S_c$ of the said transformer is no longer a leading current but is more generally a lagging current. The fact of this lagging current passing through the inductance L is no longer to augment the E. M. F. of the transformer but to diminish it and that to a greater and greater degree the more severe the short circuit, hence, the inductance L has two very valuable features; the one, that it tends to boost up the voltage in ordinary working for the supplying of the charging currents; whether for the sending, or for the receiving, end of the line; the other, that it greatly reduces the rush of current which would otherwise take place out of the transformer on the occasion of a short circuit between the intersheaths, and thus permits of the further reducing of the quantity of conducting material required for the intersheaths.

The beneficial results obtained from a transmission system as hereinbefore described render the system particularly suitable for long line transmission wherein part of the system may be constituted by overhead wires. The present system admits of the load and charging currents being transmitted along the underground section of the line in an economical and efficient manner and the central cores of the cable at the change over have only to be connected to the requisite overhead line and the cable transmission system repeated when the line is again changed back to the underground system.

Having now particularly described and ascertained the nature of my said invention, and in what manner the same is to be performed, I declare that what I claim is:—

1. In a high-tension alternating-current system including a concentric cored cable comprising current transmitting conductors in which the requisite capacity current for the outermost core or cores is transmitted through the central core of the cable at a maximum transmission voltage to the point or points at which the current is to be fed to the outer core or cores, means for supplying said capacity current at the required pressure or pressures to said outer core or cores comprising an independent transformer at each point having its primary winding connected with the central core of the cable and neutral of the system and its secondary winding connected with one of the outer cores only and the neutral of the system whereby an efficient proportioning of the potential gradient applied to the outer core of cores and central core is obtained and the quantity of conducting material required for the outer core or cores is minimized.

2. In a high-tension alternating-current concentric cored cable system of electric power transmission in which the requisite capacity current for the outer core or cores is transmitted through the central core of the cable to a feed point or points along the line, a concentric cored cable therefor comprising a central core having a high conductivity as compared with the outer core or cores formed of a metal of lesser conductivity and the outer core or cores having a high impedance as compared with inner core as and for the purpose specified.

3. In a high-tension alternating-current concentric cored cable system of electric power transmission in which the requisite capacity current for the outer core or cores is transmitted through the central core of the cable to a feed point or points along the line, a concentric cored cable therefor comprising a central core having a high conductivity and an outer core or cores formed of a ferrous material substantially as and for the purpose specified.

4. In a high-tension alternating-current system including a concentric cored cable comprising current transmitting conductors in which the requisite capacity current for the outermost core or cores is transmitted through the central core of the cable at a maximum transmission voltage to the point or points at which the current is to be fed to the outer core or cores, means for supplying said capacity current at the required pressure or pressures to said outer core or cores from said central core comprising a transformer fed therefrom and feeding into one of said outer cores, and an inductance connected between said outer core and the transformer, whereby the potential gradient of the cores is attained and a reduction of the current that would be fed into said outer core in the event of a short circuit is ensured, resulting in a reduction of conducting material substantially as herein described.

5. In a high-tension alternating-current system including a concentric cored cable comprising current transmitting conductors in which the requisite capacity current for the outermost core or cores is transmitted through the central core of the cable at a maximum transmission voltage to the point or points at which the current is to be fed to the outer core or cores, means for supplying said capacity current at the required pressure or pressures to said outer core or cores comprising a transformer winding fed from the central core of the cable at each of said points and having a proportional tapping or tappings connected with said outer core or cores whereby an efficient proportioning of the potential gradient applied to the outer core or cores and central core is obtained and the quantity of conducting material required for the outer core or cores is minimized.

6. In a high-tension alternating-current system including a concentric cored cable comprising current transmitting conductors in which the requisite capacity current for the outermost core or cores is transmitted through the central core of the cable at a maximum transmission voltage to the point or points at which the current is to be fed to the outer core or cores, means for supplying said capacity current at the required pressure or pressures to said outer core or cores comprising an independent transformer at each point having its primary winding connected with the central core of the cable and neutral of the system and its secondary winding connected with one of the outer cores only and the neutral of the system, and a transformer winding fed from the central core of the cable at each of said points and having a proportional tapping or tappings which may be connected with said outer core or cores, whereby an efficient proportioning of the potential gradient applied to the outer core or cores and central core is obtained and the quantity of conducting material required for the outer core or cores is minimized.

In testimony whereof he affixes his signature.

ALFRED MILLS TAYLOR.